US 9,409,266 B2

(12) United States Patent
Buldtmann et al.

(10) Patent No.: US 9,409,266 B2
(45) Date of Patent: Aug. 9, 2016

(54) METHOD AND DEVICE FOR CHANGING A FRONT SEAL PLATE IN AN AIRCRAFT ENGINE

(75) Inventors: Markus Buldtmann, Ahlerstedt (DE); Alexander Hinz, Ratekau (DE); Eugen Roppelt, Hamburg (DE); Jens Fitter, Hamburg (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 293 days.

(21) Appl. No.: 13/982,445

(22) PCT Filed: Jan. 24, 2012

(86) PCT No.: PCT/EP2012/000297
§ 371 (c)(1),
(2), (4) Date: Oct. 18, 2013

(87) PCT Pub. No.: WO2012/100933
PCT Pub. Date: Aug. 2, 2012

(65) Prior Publication Data
US 2014/0130352 A1    May 15, 2014

(30) Foreign Application Priority Data

Jan. 28, 2011    (DE) .......................... 10 2011 009 770

(51) Int. Cl.
*B23P 19/04* (2006.01)
*B23P 6/00* (2006.01)
*F01D 25/28* (2006.01)

(52) U.S. Cl.
CPC .............. *B23P 19/042* (2013.01); *B23P 6/002* (2013.01); *F01D 25/285* (2013.01); *F05D 2230/60* (2013.01); *F05D 2230/70* (2013.01); *F05D 2230/80* (2013.01); *F05D 2240/50* (2013.01); *F05D 2240/55* (2013.01); *Y10T 29/4973* (2015.01); *Y10T 29/49297* (2015.01);
(Continued)

(58) Field of Classification Search
CPC ........ B23P 6/002; B23P 6/005; B23P 19/027; B23P 19/042; F01D 11/00; F01D 11/003; F01D 11/005; F01D 25/16; F01D 25/285; F05D 2230/60; F05D 2230/70; F05D 2230/72; F05D 2230/80; F05D 2240/54; F05D 2240/55; Y10T 29/49318; Y10T 29/4932; Y10T 29/49719; Y10T 29/49721; Y10T 29/49723; Y10T 29/4973; Y10T 29/49822
See application file for complete search history.

(56) References Cited

U.S. PATENT DOCUMENTS 4,200,273 A    4/1980    Das Gupta et al.
4,685,286 A    8/1987    Hetzer et al.
(Continued)

FOREIGN PATENT DOCUMENTS

DE    1 086 950    8/1960
DE    196 43 336    4/1998
(Continued)

*Primary Examiner* — Ryan J Walters
*Assistant Examiner* — Matthew P Travers
(74) *Attorney, Agent, or Firm* — Saliwanchik, Lloyd & Eisenschenk

(57) ABSTRACT

Method for removing a front seal plate from an aircraft engine, the method comprising at least the following steps:
  a) separating a part engine unit from the aircraft engine, the part engine unit comprising the core engine and the low-pressure turbine of the aircraft engine,
  b) removing a front seal plate nut from the part engine unit,
  c) removing the front seal plate from the part engine unit.

8 Claims, 3 Drawing Sheets

(52) U.S. Cl.
CPC ...... *Y10T29/49318* (2015.01); *Y10T 29/49721* (2015.01); *Y10T 29/49822* (2015.01); *Y10T 29/53* (2015.01)

(56) References Cited

U.S. PATENT DOCUMENTS

| | | |
|---|---|---|
| 5,220,784 A | 6/1993 | Wilcox |
| 6,196,790 B1 | 3/2001 | Sheridan et al. |
| 6,203,273 B1 | 3/2001 | Weiner et al. |
| 8,167,534 B2 | 5/2012 | Cornelius et al. |
| 2008/0240917 A1 | 10/2008 | Eleftheriou et al. |
| 2012/0151735 A1* | 6/2012 | Thomas ............. B25B 27/062 29/426.5 |

FOREIGN PATENT DOCUMENTS

| | | |
|---|---|---|
| DE | 201 17 970 | 2/2002 |
| DE | 699 26 203 | 1/2006 |
| DE | 699 26 594 | 5/2006 |
| DE | 11 2007 002 151 | 7/2009 |
| GB | 2 283 535 | 5/1995 |
| GB | 2 320 527 | 6/1998 |

\* cited by examiner

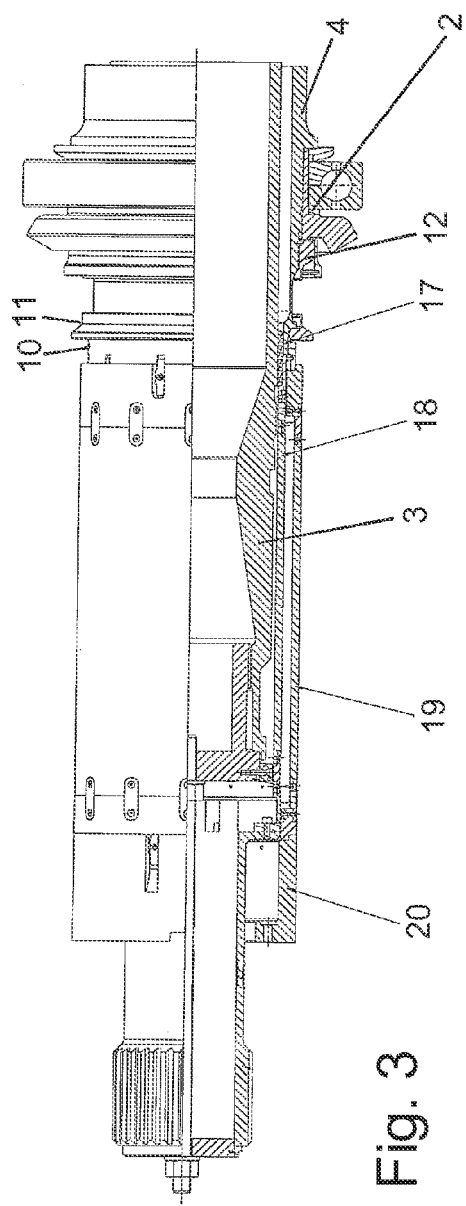
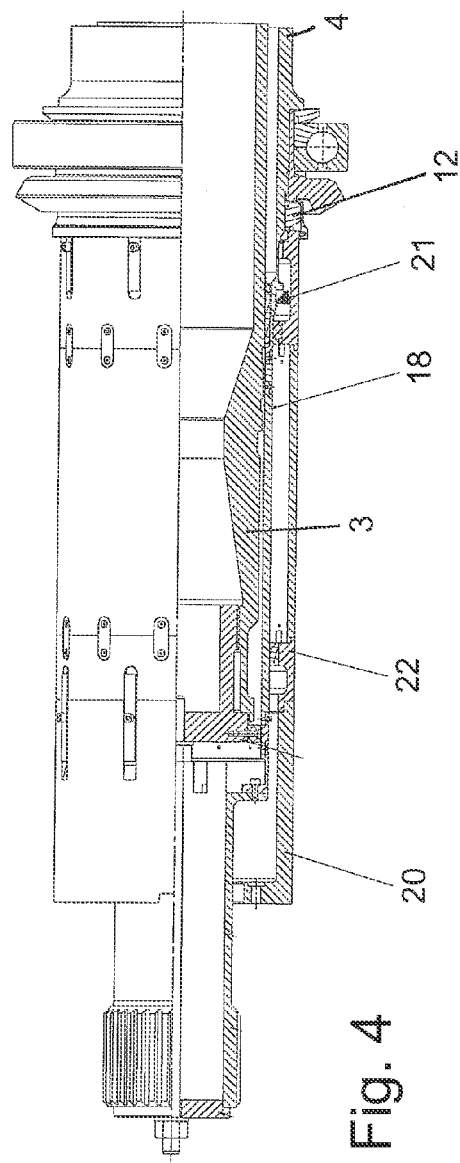
Fig. 3
Fig. 4

METHOD AND DEVICE FOR CHANGING A FRONT SEAL PLATE IN AN AIRCRAFT ENGINE

CROSS-REFERENCE TO RELATED APPLICATION

This application is the U.S. national stage application of International Patent Application No. PCT/EP2012/000297, filed Jan. 24, 2012.

FIELD OF INVENTION

The invention relates to a method for changing a front seal plate and/or a bearing unit in an aircraft engine, and to a corresponding device.

BACKGROUND OF THE INVENTION

During use, aircraft engines are subject to a number of external influences, which can lead to components becoming worn. Such wear can affect the front seal plate, for example, which is provided in an aircraft engine inter alia for sealing a bearing unit. By means of such bearing units, the shafts provided for power transmission are mounted in aircraft engines. Depending on the engine model, two or three shafts are generally used.

An example of a two-shaft engine is the Pratt & Whitney 4000 (PW4000) engine model. An inner N1 (low-pressure) shaft here serves to transmit power from the low-pressure turbine to the low-pressure compressor, and a second N2 (high-pressure) shaft that surrounds the N1 shaft coaxially transmits power from the high-pressure turbine to the high-pressure compressor. At its front end associated with the low-pressure compressor, the N2 shaft is mounted in the engine shroud by way of a bearing unit. When that bearing unit and/or the front seal plate arranged close to the bearing unit have to be exchanged, for example because of wear phenomena, this is carried out according to a known specified sequence.

This known sequence provides that the engine must first be detached from the wing of the aircraft in order subsequently to be transported to a workshop. The known method will be explained briefly with the aid of FIG. 1. In the workshop, the low-pressure turbine 7 is separated from the remainder of the aircraft engine 1 in a first major step. In the case of the PW 4000 engine, the low-pressure turbine 7 comprises the N1 shaft 3 and the turbine exhaust case. In order to dismantle this component assembly, a large number of conduit systems and further components must be removed from the aircraft engine 1. Overall, separation of the component assembly from the remainder of the engine is complex.

The core engine 6 is then removed from the engine, the core engine 6 also including the bearing unit 2 that is to be exchanged and the front seal plate. The core engine 6 generally further comprises the high-pressure compressor 30, the combustion chamber 31 and the high-pressure turbine 29.

There remains a cylindrical cavity in the core engine 6, because the N1 shaft 3 has to be withdrawn from the core engine 6 in the course of the separation of the low-pressure turbine 7 from the remainder of the engine.

When the core engine 6 has been removed, and after further components, such as, for example, the front seal plate nut, have been dismantled, the front seal plate and the bearing unit 2 to be repaired or changed can be unscrewed or removed from the N2 shaft 4. After the components have been repaired or exchanged, they are pushed or screwed onto the N2 shaft 4 again and the aircraft engine 1 is assembled again by a mounting process which corresponds substantially to the dismantling process in reverse.

This known method is very complex and expensive, in particular because the engine has to be dismantled to a large degree in order to exchange the bearing unit and/or the front seal plate. In particular, it is not possible to exchange a front seal plate "on-wing" on an engine that is still attached to the aircraft wing.

Accordingly, the object underlying the invention is to provide a method for changing a bearing unit in an aircraft engine in which the bearing unit can be exchanged with a reduced outlay.

The invention achieves that object with the features of the independent claims. Further preferred embodiments of the invention are to be found in the dependent claims, the figures and the associated description.

BRIEF SUMMARY OF THE INVENTION

In order to achieve the object, there is proposed according to the invention a method for removing a front seal plate from an aircraft engine, which method comprises at least the following steps:
 a) separating a part engine unit from the aircraft engine, the part engine unit comprising the core engine and the low-pressure turbine of the aircraft engine,
 b) removing a front seal plate nut from the part engine unit,
 c) removing the front seal plate from the part engine unit.

There is further provided according to the invention a corresponding fitting, that is to say a method for fitting a front seal plate into an aircraft engine, the method comprising at least the following steps:
 d) fitting the front seal plate into the part engine unit of an aircraft engine, the part engine unit comprising the core engine and the low-pressure turbine of the aircraft engine,
 e) fitting a front seal plate nut into the part engine unit,
 f) attaching the part engine unit to the aircraft engine.

Both methods effect considerable time and cost savings, because the complex step of first separating the low-pressure turbine with the N1 shaft and the turbine exhaust case from the remainder of the engine can be omitted.

Consequently, considerably fewer components, such as, for example, conduit systems, have to be removed from the turbine case than is the case with the dismantling of the low-pressure turbine provided according to the prior art.

In the method according to the invention, a bearing unit is preferably removed or fitted as a further step. Bearing units have to be repaired or replaced as described at the beginning, for example for reasons of wear. Initial tests have shown that the time saving achieved by changing the front seal plate and the bearing unit in the manner provided according to the invention is about 290 man-hours, which, enhanced by a reduced outlay in terms of material, results in a significant cost reduction.

The bearing unit preferably comprises a roller bearing for a high-pressure shaft. In addition, the bearing unit preferably comprises a bevel wheel. The roller bearing can be mounted on the bevel wheel, which in turn is seated on a shaft. This bearing unit can be exchanged with relatively little outlay by the method according to the invention.

Preferably, the bearing unit is pushed by a force application element onto the shaft to be mounted, the force application element to that end being supported on the thread on the shaft, onto which the front seal plate nut was threaded, directly or by way of a lengthening arrangement. The force application element can be a hydraulic cylinder, for example. The force application element transmits the generated force to the bearing unit by way of a pushing-on sleeve. It is advantageous if the force application element can be supported on the same shaft onto which the bearing unit is pushed, for example the N2 shaft. In the case of a bearing change of the PW4000 according to the prior art, this can be effected, for example, by insertion of a retainer into the cavity of the N2 shaft from the inside, which is then purposively wedged. This cavity that is present in the prior art does not occur when the method according to the invention is carried out, because the N1 shaft is still located inside the part engine unit. In order nevertheless to create the possibility for support on the N2 shaft, a device is provided according to the invention which allows the force application element to be supported on the thread on the N2 shaft, onto which the front seal plate nut was threaded, when the bearing unit is pushed on.

Tensile tests and static calculations have shown that support on the thread, which was originally provided only for screwing on the front seal plate and the front seal plate nut, is possible without problems despite the high forces that occur during pushing on of the bearing unit.

According to the invention there is proposed a further, "on-wing" method for removing the front seal plate, the method comprising at least the following steps:
  g) removing the engine fan,
  h) removing a coupling,
  i) removing a support element,
  j) removing a front seal plate nut,
  k) removing the front seal plate.

There is further proposed according to the invention also a corresponding fitting, that is to say a method for fitting a front seal plate into an aircraft engine, the method comprising at least the following steps:
  l) fitting the front seal plate,
  m) fitting a front seal plate nut,
  n) fitting a support element,
  o) fitting a coupling,
  p) fitting the engine fan.

The advantage of methods g) to k) and l) to p) is that the aircraft engine does not have to be removed from the wing of the aircraft in order to fit or remove the front seal plate. The aircraft engine is accordingly preferably mounted on the wing of an aircraft during the method. By changing the front seal plate "on-wing" in that manner, the required outlay for repairing or changing a front seal plate can be reduced significantly. Not only are the high costs of transporting the engine to the workshop saved, but the engine is also ready for use again much more quickly and accordingly more economically. One or more of the described methods can also be used under certain circumstances with stationary gas turbines.

BRIEF DESCRIPTION OF THE DRAWINGS

The invention will be explained in the following by means of preferred embodiments and with reference to the accompanying figures. The figures show in detail:
FIG. 3: cross-section through the N1 and N2 shaft during loosening and tightening of the front seal plate nut;
FIG. 4: cross-section through the N1 and N2 shaft during loosening and tightening of the bearing nut.

DETAILED DESCRIPTION OF THE INVENTION

Figure 1:
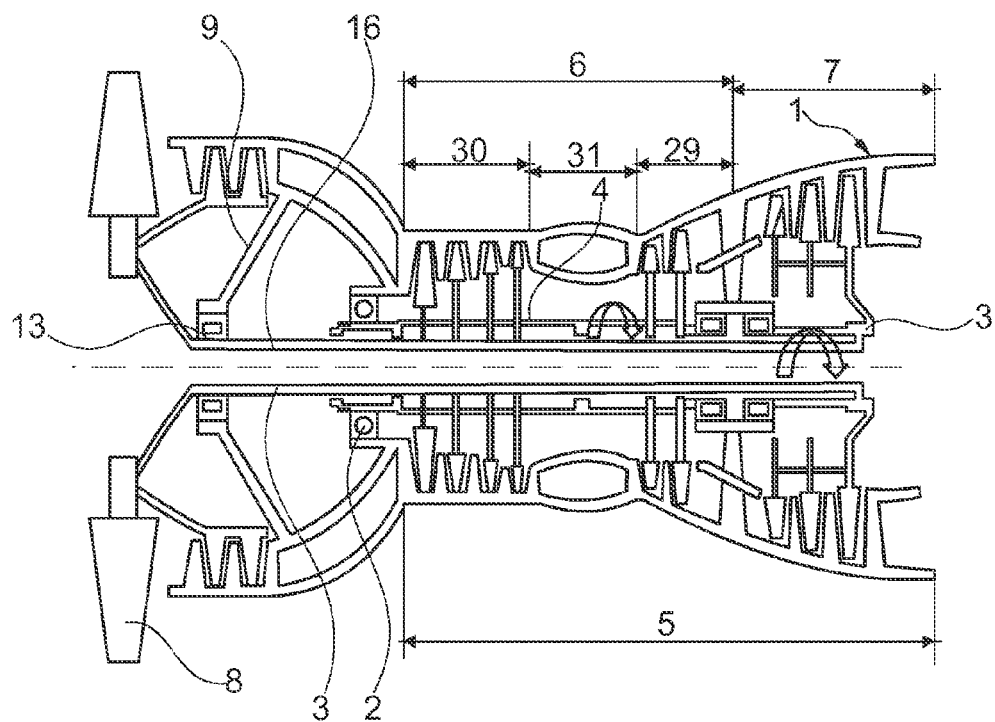
FIG. 1: schematic representation of the construction of an aircraft engine.

FIG. 1 shows a schematic representation of an aircraft engine 1. It is a two-shaft engine, wherein the N1 shaft 3 is surrounded coaxially by the N2 shaft 4. The N1 shaft 3 transmits a torque from the low-pressure turbine 7 to the engine fan 8, which is part of the low-pressure compressor. The N2 shaft 4 transmits a torque from the high-pressure turbine 29 to the high-pressure compressor 30 and is mounted at its side associated with the low-pressure compressor in the engine shroud by way of a bearing unit 2. A combustion chamber 31 is arranged between the high-pressure compressor 30 and the high-pressure turbine 29, all three engine parts are part of a unit referred to as the core engine 6. The low-pressure turbine 7 together with the core engine 6 forms a superordinate component assembly referred to as the part engine unit 5, which is also referred to as the split engine.

In the region of the low-pressure compressor there are arranged between the engine fan 8 and the N1 shaft 3 a coupling 13 and, in the case of the PW4000 engine, precisely two support elements 9. The coupling 13 is the connecting coupling between the low-pressure compressor and the low-pressure turbine. The two support elements 9 in the PW4000 engine are referred to as the so-called "1.0 bearing support" and "1.5 bearing support".

Figure 2:
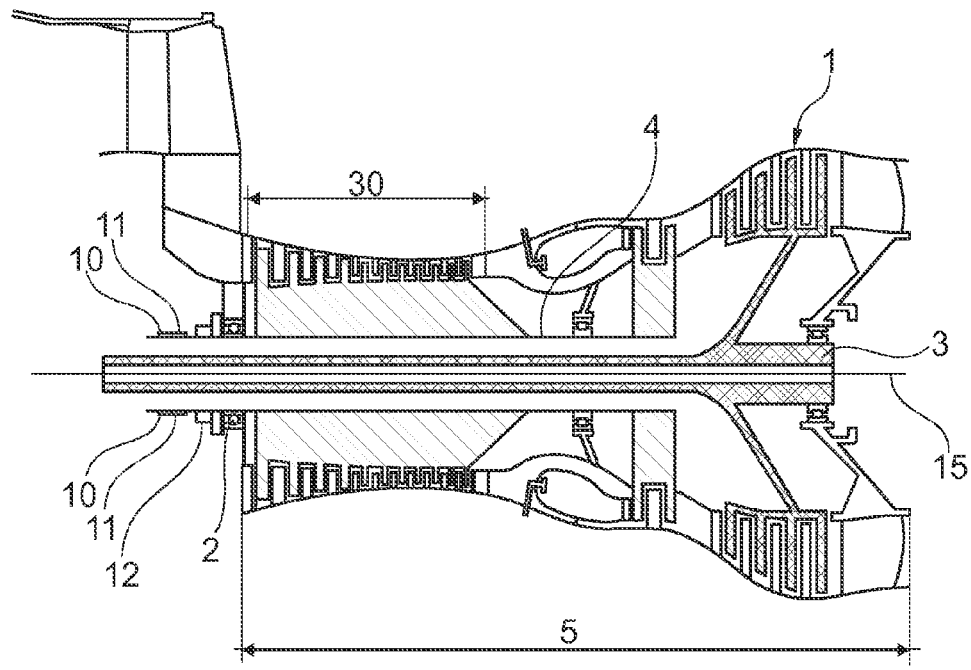
FIG. 2: representation of the assembly state of an aircraft engine prior to changing the front seal plate.

FIG. 2 likewise shows an aircraft engine 1, there being shown in FIG. 2, in addition to the bearing unit 2, also further components which are arranged on the N2 shaft 4 next to the bearing unit 2. Directly next to the bearing unit 2 there is arranged the bearing nut 12 for fixing the bearing unit 2 in position on the N2 shaft 4. Further towards the end (the so-called front hub) of the N2 shaft 4 there is arranged the front seal plate 11, which is fixed to the N2 shaft 4 by a front seal plate nut 10.

FIG. 2 shows two assembly states of the aircraft engine 1, each of which shows an intermediate step of the method according to the invention. Above the parting plane 15 there is shown the state of the engine when it is still attached "on-wing" to the wing of an aircraft. According to the invention, this state is reached, starting from an engine attached to an aircraft, by removing the engine fan 8, the "fan module", from the aircraft engine 1 in a first step and then removing the coupling 13 and one or more support elements 9 in two further steps.

According to the invention, the assembly state shown beneath the parting plane 15 is reached by separating the part engine unit 5 from the remainder of the engine, the N1 shaft 3 protruding from the high-pressure compressor 30 in both cases shown because it remains in the part engine unit 5. The next step in both methods according to the invention is to loosen the front seal plate nut 10. This step is shown in FIG. 3.

FIG. 3 shows a cross-section through the N1 and N2 shaft (3, 4) during loosening of the front seal plate nut 10, a cross-sectional view and an outside view being combined in FIG. 3 and in FIGS. 4 and 5 described below.

In FIG. 3 there can be seen the N2 shaft 4, on which there are seated the bearing unit 2, the bearing nut 12 and also the front seal plate 11 and the front seal plate nut 10. The N2 shaft 4 surrounds the N1 shaft 3, which protrudes from the N2 shaft 4. Between the N1 and N2 shaft (3, 4) there is arranged a spacer ring 17, which remains between the shafts during the removal and fitting of the front seal plate 11 and optionally of the bearing unit 2. Not shown is the N1 shaft retainer, which can be provided on the low-pressure turbine side of the N1 shaft 3 for fixing the N1 shaft 3. A sleeve-like N2 shaft lengthening piece 18 is slipped over the N1 shaft 3, and a front seal plate nut lengthening piece 19 is slipped over the N2 shaft lengthening piece 18. The N1 shaft 3 is shielded by the N2 shaft lengthening piece 18, and damage to the N1 shaft 3 during the removal of components is thus avoided. In addition, the front seal plate nut lengthening piece 19 is fixed radially in position. A torque is transmitted by way of a torque key 20 to the front seal plate nut lengthening piece 19, which in turn transmits the torque to the front seal plate nut 10, as a result of which the front seal plate nut 10 can be unscrewed. The front seal plate 11 is then also removed, so that there are no more components on the thread 21 on the N2 shaft (see FIG. 4). The front seal plate 11 can then be repaired or exchanged for a new front seal plate 11.

If only the front seal plate 11 and not additionally the bearing unit 2 is to be changed, the engine can be assembled again according to the invention after the front seal plate 11 has been exchanged.

Figure 5:
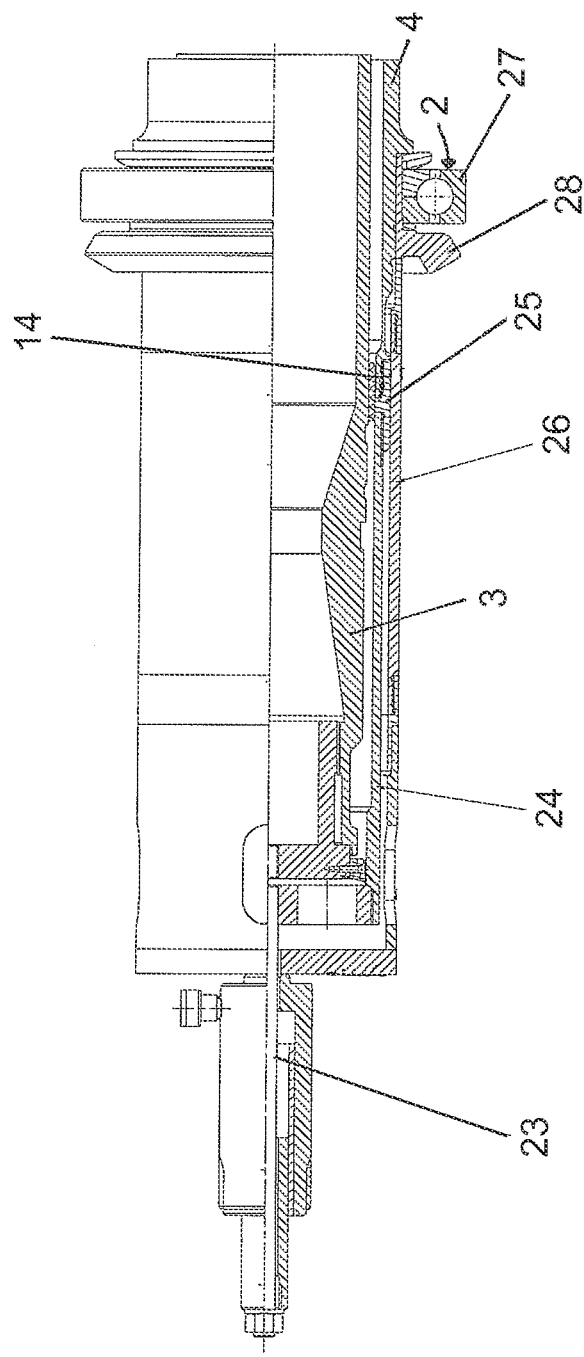
FIG. 5: cross-section through the N1 and N2 shaft during the pushing of a bearing unit onto the N2 shaft.

FIGS. 4 and 5 show how, in addition to a change or repair of the front seal plate 11, the bearing unit 2 can also be repaired or exchanged.

Following the dismantling of the front seal plate nut 10 and of the front seal plate 11, the bearing nut 12 is loosened. This is shown in FIG. 4. In order to loosen the bearing nut 12, a torque is transmitted from a torque key 20 by way of a bearing nut lengthening piece 22, so that the bearing nut 12 can thus be unscrewed. In the next step, the bearing unit 2 can be removed from the N2 shaft 4. This can be effected, for example, by a removal device, in which, for example, a hydraulic cylinder provides a tensile force with which the bearing unit 2 can be removed from the N2 shaft 4. This device preferably engages behind the bevel wheel 28, which is part of the bearing unit 2, and with the bevel wheel 28 also removes the bearing, which is here in the form of a roller bearing 27.

FIG. 5 shows how a new or repaired bearing unit 2 is pushed onto the N2 shaft 4. A force application element 23, which is preferably in the form of a hydraulic cylinder, provides the required force. The force is transmitted to the bearing unit 2 by way of a pushing-on sleeve 26. According to the invention, the force application element 23 is supported on the thread 21 of on the N2 shaft, onto which the front seal plate nut 10 was threaded, directly or by way of a lengthening arrangement 24. A connecting sleeve 25 is provided, which here is part of the lengthening arrangement 24, and by way of which the force application element 23 is able to be supported on the thread 21 (see FIG. 4) on the N2 shaft, onto which the front seal plate nut 10 was threaded. The connecting sleeve 25 is screwed onto the thread 21 and is thus able, according to the invention, to transmit to the N2 shaft 4 the forces that occur when the bearing unit 2 is pushed on. The force application element 23 is accordingly able to be supported on the N2 shaft 4, it being necessary hitherto to remove the N1 shaft 3 for that purpose. Consequently, no cavity is required inside the N2 shaft 4 for pushing on the bearing unit 2, supported on the N2 shaft 4. Preferably, the connecting sleeve 25 has two internal threads, the first internal thread 14 being provided for screwing onto the thread 21 of on the N2 shaft, onto which the front seal plate nut 10 was threaded and the second being provided for connection with the lengthening arrangement 24.

Following the repair or change of the bearing unit 2, the aircraft engine 1 is assembled again; assembly substantially takes place in the reverse sequence to dismantling.

As a result of the method according to the invention and its variations, a large amount of time and money can be saved, in particular owing to less outlay in terms of work and lower material costs, and, in addition, wholly new possibilities, such as "on-wing" changing of the front seal plate 11, are opened up, so that it is in some cases not even necessary to provide a reserve engine when changing a front seal plate 11.

SPECIFIC EMBODIMENTS

Embodiment 1

A method for removing a front seal plate (11) from an aircraft engine (1), characterised in that the method comprises at least the following steps:
 a) separating a part engine unit (5) from the aircraft engine (1), the part engine unit (5) comprising the core engine (6) and the low-pressure turbine (7) of the aircraft engine (1),
 b) removing a front seal plate nut (10) from the part engine unit (5),
 c) removing the front seal plate (11) from the part engine unit (5).

Embodiment 2

A method for fitting a front seal plate (11) into an aircraft engine (1), characterised in that the method comprises at least the following steps:
 d) fitting the front seal plate (11) into the part engine unit (5) of an aircraft engine (1), the part engine unit (5) comprising the core engine (6) and the low-pressure turbine (7) of the aircraft engine (1),
 e) fitting a front seal plate nut (10) into the part engine unit (5),
 f) attaching the part engine unit (5) to the aircraft engine (1).

Embodiment 3

The method according to Embodiment 1 or Embodiment 2, characterised in that a bearing unit (2) is removed or fitted as a further step.

Embodiment 4

The method according to Embodiment 3, characterised in that the bearing unit (2) comprises a roller bearing (27) for a high-pressure shaft.

Embodiment 5

The method according to Embodiment 3 or Embodiment 4, characterised in that the bearing unit (2) is pushed onto the shaft to be mounted by a force application element (23), and to that end the force application element (23) is supported on the thread (21) of the front seal plate nut (10) directly or by way of a lengthening arrangement (24).

Embodiment 6

A method for removing a front seal plate (11) from an aircraft engine (1), characterised in that the method comprises at least the following steps:
 g) removing the engine fan (8),
 h) removing a coupling (13),
 i) removing a support element (9),
 j) removing a front seal plate nut (10),
 k) removing the front seal plate (11).

Embodiment 7

A method for fitting a front seal plate (11) into an aircraft engine (1), characterised in that the method comprises at least the following steps:

l) fitting the front seal plate (11),
m) fitting a front seal plate nut (10),
n) fitting a support element (9),
o) fitting a coupling (13),
p) fitting the engine fan (8).

Embodiment 8

The method according to Embodiment 6 or Embodiment 7, characterised in that the aircraft engine (1) is mounted on the wing of an aircraft during the method.

Embodiment 9

A method for changing a front seal plate (11) and/or a bearing unit (2) in an aircraft engine (1), characterised in that the method comprises removing a front seal plate (11) and/or a bearing unit (2) according to any one of Embodiments 1 to 8 and fitting a new front seal plate (11) and/or a new bearing unit (2) according to any one of Embodiments 2 to 8.

Embodiment 10

A device for removing and/or fitting a front seal plate (11) and/or a bearing unit (2) in an aircraft engine (1), characterised in that the device is provided for carrying out a method according to any one of Embodiments 1 to 9.

LIST OF REFERENCE NUMERALS

1 Aircraft engine
2 Bearing unit
3 N1 shaft
4 N2 shaft
5 Part engine unit
6 Core engine
7 Low-pressure turbine
8 Engine fan
9 Support element
10 Front seal plate nut
11 Front seal plate
12 Bearing nut
13 Coupling
14 First internal thread
15 Parting plane
16 Shaft connection
17 Spacer ring
18 N2 shaft lengthening piece
19 Front seal plate nut lengthening piece
20 Torque key
21 Thread
22 Bearing nut lengthening piece
23 Force application element
24 Lengthening arrangement
25 Connecting sleeve
26 Pushing-on sleeve
27 Roller bearing
28 Bevel wheel
29 High-pressure turbine
30 High-pressure compressor
31 Combustion chamber

The invention claimed is:

1. A method for removing a front seal plate from an aircraft engine, comprising at least the following steps:
a) separating a part engine unit from an aircraft engine,
wherein the aircraft engine comprises:
an N1 shaft;
an N2 shaft,
wherein the N1 shaft is surrounded coaxially by the N2 shaft;
a front seal plate nut;
a front seal plate; and
an engine shroud,
wherein the N2 shaft is mounted in the engine shroud via a bearing unit,
wherein the part engine unit comprises:
a core engine; and
a low-pressure turbine of the aircraft engine,
wherein the N1 shaft, the N2 shaft, the front seal plate nut, and the front seal plate remain in the part engine unit while the part engine unit is separated from the aircraft engine;
b) removing the front seal plate nut from the part engine unit,
wherein the N1 shaft and the N2 shaft remain in the part engine unit while the front seal plate nut is removed; and
c) removing the front seal plate from the part engine unit,
wherein the N1 shaft and the N2 shaft remain in the part engine unit while the front seal plate is removed.

2. The method according to claim 1,
wherein the aircraft engine further comprises:
a bearing unit,
wherein the bearing unit remains in the part engine unit while the part engine unit is separated from the aircraft engine,
wherein the method further comprises:
removing the bearing unit,
wherein the N1 shaft and the N2 shaft remain in the part engine unit while the bearing unit is removed.

3. The method according to claim 2,
wherein the bearing unit comprises a roller bearing for a high-pressure shaft.

4. The method according to claim 2,
wherein removing the bearing unit comprises applying a tensile force to the bearing unit by a force application element.

5. The method according to claim 4,
wherein removing the front seal plate nut from the part engine unit comprises unthreading the front seal plate nut from a thread on the N2 shaft,
wherein the bearing unit comprises supporting the force application element on the thread on the N2 shaft.

6. The method according to claim 5,
wherein removing the bearing unit comprises supporting the force application element via a lengthening arrangement,
that is supported on the thread on the N2 shaft.

7. The method according to claim 2, further comprising:
fitting the bearing unit or a second bearing unit into the part engine unit,
wherein the N1 shaft and the N2 shaft remain in the part engine unit while the bearing unit or a second bearing unit is fitted; and
fitting the front seal plate or a second front seal plate into the aircraft engine,
wherein fitting the front seal plate or the second front seal plate into the aircraft engine comprises:
d) fitting the front seal plate or the second front seal plate into the part engine unit,
wherein the N1 shaft and the N2 shaft remain in the part engine unit while the front seal plate or the second front seal plate is fitted;
e) fitting the front seal plate nut or a second front seal plate nut into the part engine unit, wherein the N1 shaft and the N2 shaft remain in the art engine unit while the front seal plate nut or the second front seal plate nut is fitted; and f) attaching the part engine unit to the aircraft engine.

8. The method according to claim 1, further comprising:

fitting the front seal plate or a second front seal plate into the aircraft engine, wherein fitting the front seal plate or the second front seal plate into the aircraft engine comprises:

d) fitting the front seal plate or the second front seal plate into the part engine unit of the aircraft engine;

e) fitting the front seal plate nut or a second front seal plate nut into the part engine unit; and f) attaching the part engine unit to the aircraft engine.

* * * * *